Jan. 28, 1958

I. L. RUIZ 2,821,047

COMBINATION CRAB TRAP AND NET

Filed April 20, 1956

INVENTOR
IGNACIO L. RUIZ

BY Robert I. Hulsizer

ATTORNEY

Jan. 28, 1958 I. L. RUIZ 2,821,047
COMBINATION CRAB TRAP AND NET
Filed April 20, 1956 2 Sheets-Sheet 2
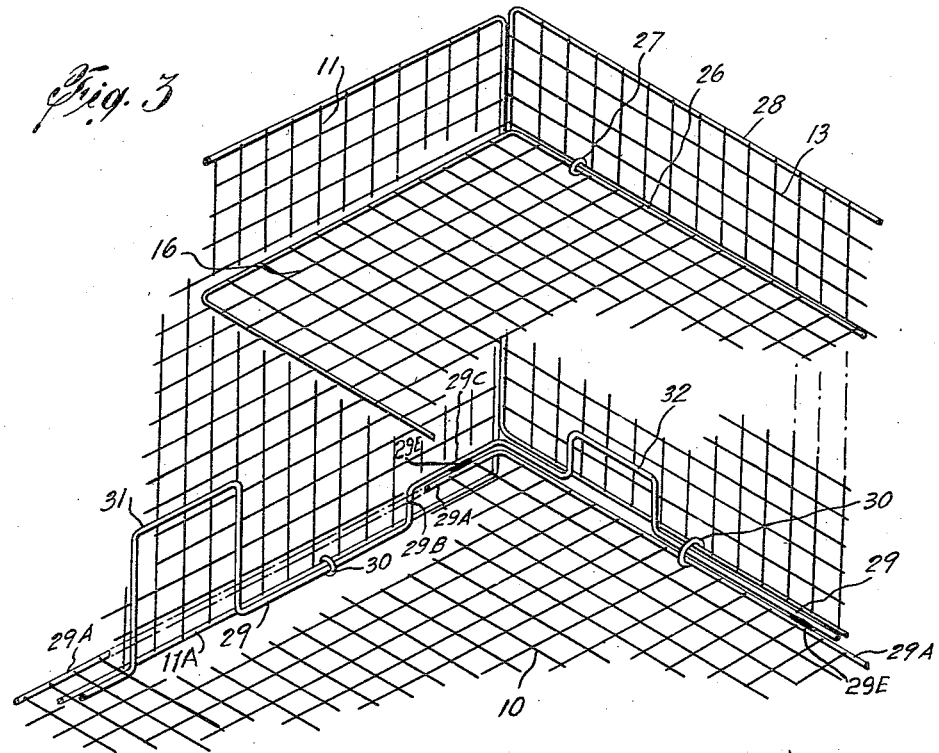
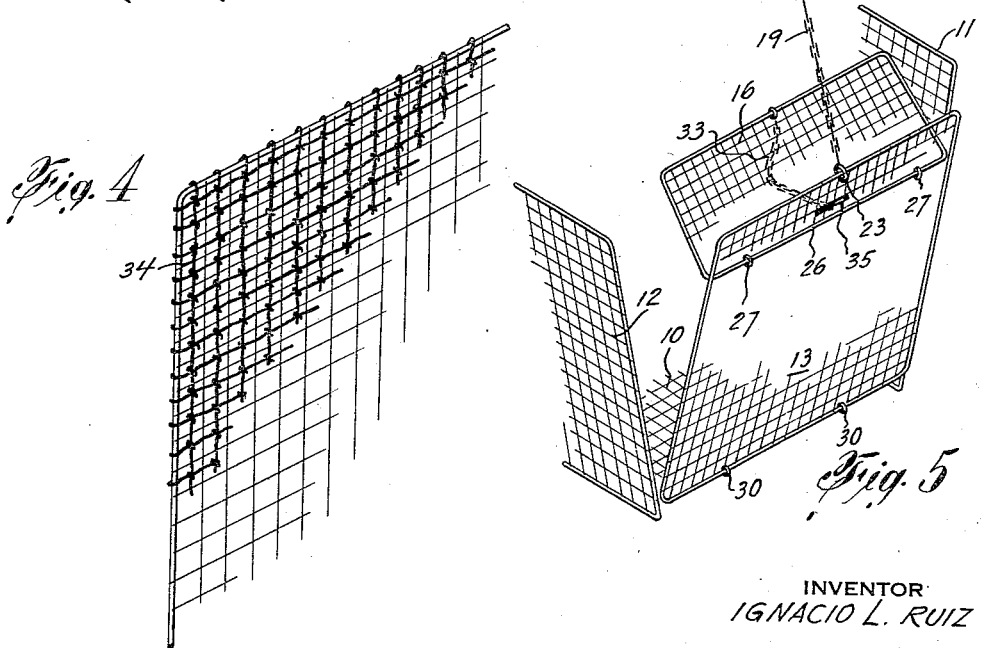
INVENTOR
IGNACIO L. RUIZ
BY Robert I. Hulsizer
ATTORNEY

United States Patent Office 2,821,047
Patented Jan. 28, 1958

2,821,047

COMBINATION CRAB TRAP AND NET

Ignacio L. Ruiz, Bronx, N. Y.

Application April 20, 1956, Serial No. 579,627

8 Claims. (Cl. 43—102)

This invention relates to fishing nets and in particular to a combination trap and net for use in crabbing.

A particular object of the invention is to so construct a crab trap that when it is lowered to the bottom, the side walls and top or cover will be caused to fall outwardly so that all parts of the trap will lie flat on the ground and present a minimum amount of obstruction to crabs or other aquatic creatures in seeking the bait.

Another object of the invention is to provide a foldable trap that can be collapsed and the parts so nested that they will require very little storage space, and at the same time can be readily set up for use.

Still further objects of the invention are provisions for: an auxiliary frame part that will limit the inward swinging movement of the side walls so that the trap will safely hold a heavy catch as it is being lifted from the water; the use of adjustable holding means for the covers that will allow them to be folded flat when not in use; a structure such that strong tides will not be able to roll and close the net or trap as it lies on the bottom; the absence of projecting parts, that snag on banks, and loose parts that become separated and lost or require manipulation for setting up the net; and further to provide a crab trap to which a corded or knotted net can be applied for enmeshing the catch so that as the covers close when the trap is lifted, the victims or catch clinging to the closing side walls will be pushed down into the bottom of the trap.

With these and other objects in view, the invention comprises certain constructions hereinafter described and then particularly pointed out in the claims and a preferred embodiment of my invention is illustrated in the accompanying drawings, in which:

Figure 3 is an enlarged fragmentary view in perspective with parts being broken away to show the construction, Figure 4 is a view in perspective of an enlarged corner of a panel of the trap showing how a net can be applied thereto, and Figure 5 is a fragmentary view in perspective showing the structural details of a cover mounting.

Figure 1:
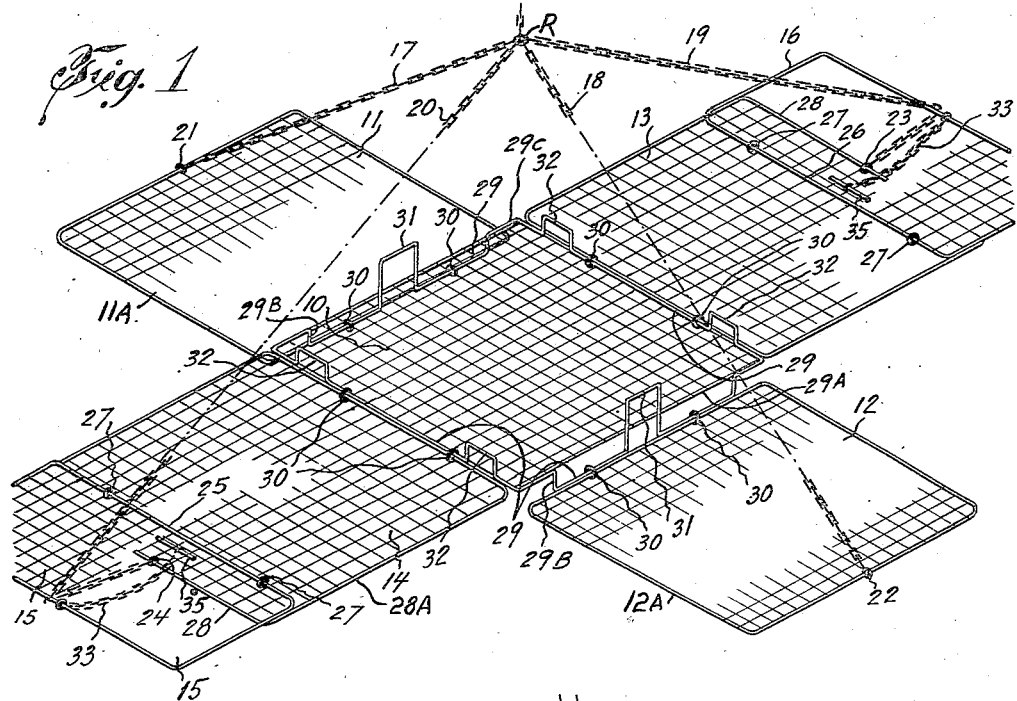
Figure 1 is a view in perspective of a trap or net shown in open position as it would appear in crab fishing.
Figure 2:
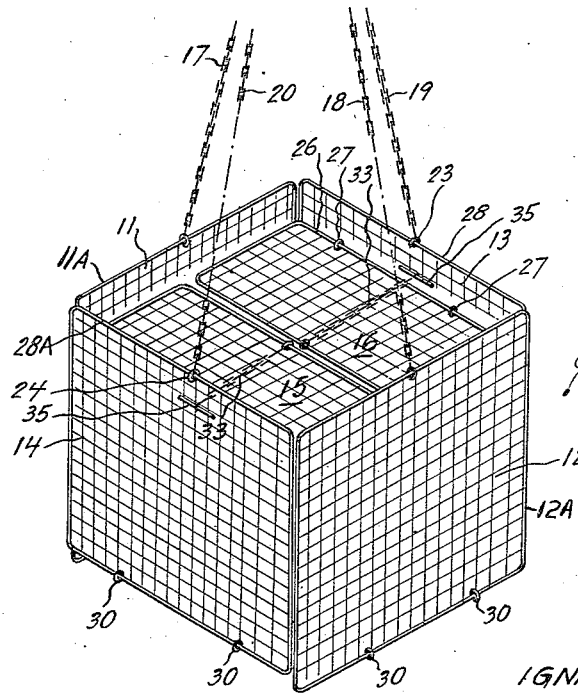
Figure 2 is a view in perspective of the trap shown in Figure 1 as it would appear when closed or being raised from the bottom with a "catch,"

Referring to the drawings in detail 10 indicates the rectangular base or bottom panel of the trap which is made of wire latticework, as are the box forming side doors or panels 11, 12, 13 and 14 arranged in abutting edge relation so that when the trap hits bottom, when lowered under water, the sides will drop open, as seen in Figure 1, to permit ingress of the crab or other aquatic creature to bait ordinarily scattered on the base panel 10. Each of the opposite side doors 13 and 14 has pivoted to the inner side thereof, adjacent the top edge, a half cover 15 and 16 respectively which coact, when the trap is lifted, to provide a full closure across the top of the receptacle as shown in Figure 2.

The trap, or crab net as it is sometimes referred to, is raised and lowered by a suitable line or chain extending from a center ring R from which the chains 17, 18, 19 and 20 radiate to control the opening and closing of the respective side doors or panels 11, 12, 13 and 14 to which the ends of said chains are connected by suitable clip rings 21, 22, 23 and 24. Each of the panels is stiffened and held in shape by its heavy wire edge frame, the frames 25 and 26 indicating the wire edge of the half covers 15 and 16 respectively which are joined for swinging movement to the side doors 13 and 14 by pivot or clip rings 27. The frame 28 of panel 13, as well as the frame 28A of panel 14, is secured for swinging movement to a stop frame 29 and a frame 29A of the base or bottom panel 10 by the rings 30, while the frames 11A and 12A of the doors or panels 11 and 12 respectively, are pivoted by rings 30 to a stop frame 29 only which is secured, in any manner as by spot welding or soldering 29E (Fig. 3) at spaced points, to the frame 29A of the bottom 10.

The frame 29 is an auxiliary or stop frame that coincides with frame 29A in rectangular shape, but is one of the features of my invention as it permits the side doors to be hinged with respect to the base 10 so that the doors lie perfectly flat when the trap is open and hence present a minimum amount of obstruction to the progress of a crab seeking the bait. The frame 29 is of heavier gauge rod than the frame 29A of the bottom and the frames 11A, 12A, 28 and 28A of the respective door panels and in those portions adjacent the edges of the sides 11 and 12, the stop frame 29 is downwardly offset as at 29B, below the level of the panel, throughout the major portion of its length, at opposing sides, except at its center where it is shaped to provide an upwardly disposed offset bumper 31 substantially at the center of said downwardly offset reach. The outer extremities 29C of the frame 29 adjacent the corners coact with each bumper 31 in supporting the side panels in closed position so that they will not collapse under the weight of a heavy "catch" in the trap as the latter is hoisted out of the water. The sides of the frame 29 adjoining the doors or side panels 13 and 14 are not downwardly offset but are provided with spaced upwardly directed bumpers 32 which serve the same purpose as the bumpers 31.

In view of the fact that the sides cannot fold inwardly but must be rigidly supported by the bumpers, the downwardly offset portions at opposite sides of the frame 29 allow the sides 13 and 14 to be reversely folded beneath the bottom panel 10 and under the sides 11 and 12 when the latter are folded in the same manner to provide a nested arrangement of all of the parts of the trap to produce a compact bundle readily carried or stored in a small space.

While the half covers 15 and 16 are suspended in closed position by the cover chains 33 attached to the frames 13 and 14, I may employ, as shown in Figure 5, a chain pin 35, somewhat in the nature of a cotter, that can be passed through the latticework openings of the side panels 13 and 14 for adjusting the position of the half covers as desired, or for freeing them so that they can be folded flat against the panels for compact storage.

As shown in Figure 4 I may line the trap with a corded or knotted fish net or fine wire mesh for entrapping smaller catch or victims and for entangling crabs or other crustaceans so that they cannot readily leave the trap or net.

It is evident therefore that I have provided a trap or net in which crabs or the like can be entangled and which, due to the bumper construction, will cause the sides of the trap to open as soon as the bottom panel of the trap reaches the fishing bed. Further, crabs feeding on bait on the open sides of the trap will be dumped into the trap by the force of the sides hitting the bumpers when the trap is retrieved and the closing of the covers will prevent the "catch" from floating out of the trap or net.

My invention is not to be restricted to the precise details of construction shown since various changes and modifications may be made therein without departing from the scope of the invention or sacrificing the advantages to be derived from its use.

What I claim is:

1. A combination crab trap and net including two sets of opposed latticework side doors and a bottom panel to which said side doors are hinged to be swung from open flat to box forming position when the trap is lifted, said doors and bottom each having rectangular frame portions to which said latticework is connected, hinge ring means for pivotally connecting the frames of a first set of opposed doors to the frame of the bottom, an auxiliary frame fast to said bottom frame and coextensive therewith, hinge ring means for pivotally connecting the frames of a second set of opposed doors to said auxiliary frame, latticework panel means constituting half covers each having a frame to which the latticework is connected, hinge ring means for pivotally connecting the frame of each half cover to the first set of doors below the upper edge thereof, means for limiting the closing movement of said half covers and flexible lift means adapted to close the sets of doors and to coact with the half covers to close the trap.

2. A trap of the character set forth in claim 1 wherein said auxiliary frame, in the opposite sides to which the second set of doors is hinged, is shaped to provide an offset section extending below the level of said bottom panel and defining a storage space for the side doors when the latter are folded beneath said bottom.

3. A trap of the characted set forth in claim 1 wherein said auxiliary frame, in each of the opposite sides to which the second set of doors is hinged, is arranged to provide an upwardly extending offset portion constituting a bumper for limiting the closing movement of said second set of side doors when the trap is closed.

4. A trap of the character set forth in claim 1 wherein said auxiliary frame, in each of the opposite sides to which the sets of doors are hinged, is shaped to provide upwardly extending offset portions constituting bumpers for limiting the closing movement of all the doors when the trap is closed.

5. A trap of the character set forth in claim 4 including a flexible holding means connecting the frame of said half covers with the latticework of the door to which it is hinged and pin means passable through said latticework for detachably anchoring the free end of said flexible holding means to said door.

6. A trap of the character set forth in claim 1 wherein said auxiliary frame, in the opposite sides to which the second set of doors is hinged, is shaped to provide an offset section extending downwardly below the level of said bottom panel and defining a storage space for the side doors when the latter are folded beneath said bottom, and an upwardly extending offset portion in said offset section constituting a bumper for limiting the closing movement of said second set of doors when the trap is closed.

7. A trap of the character set forth in claim 6 wherein the sides of the auxiliary frame adjacent the first set of doors are each shaped to provide upwardly extending bumper means for limiting the closing movement of said first set of doors when the trap is closed.

8. A combination trap including opposed sets of latticework side doors and a bottom, a net of finer mesh than said latticework arranged to be applied as a cover to each of said side doors and the bottom, said doors being hinged to said bottom for closing movement from an open position to form a box-like trap structure, a rectangular open frame on said bottom shaped to provide upwardly directed offset portions on each side thereof constituting bumpers for limiting the closing movement of said doors, and half panel members hinged to the opposite doors of one set of said doors and adapted to cooperate when the trap is closed to form a cover therefor.

References Cited in the file of this patent
UNITED STATES PATENTS

| | | |
|---|---|---|
| 943,525 | Drake | Dec. 14, 1909 |
| 1,968,758 | Gatch | July 31, 1934 |
| 2,584,643 | Vander Chute | Feb. 5, 1952 |